Patented Jan. 18, 1938

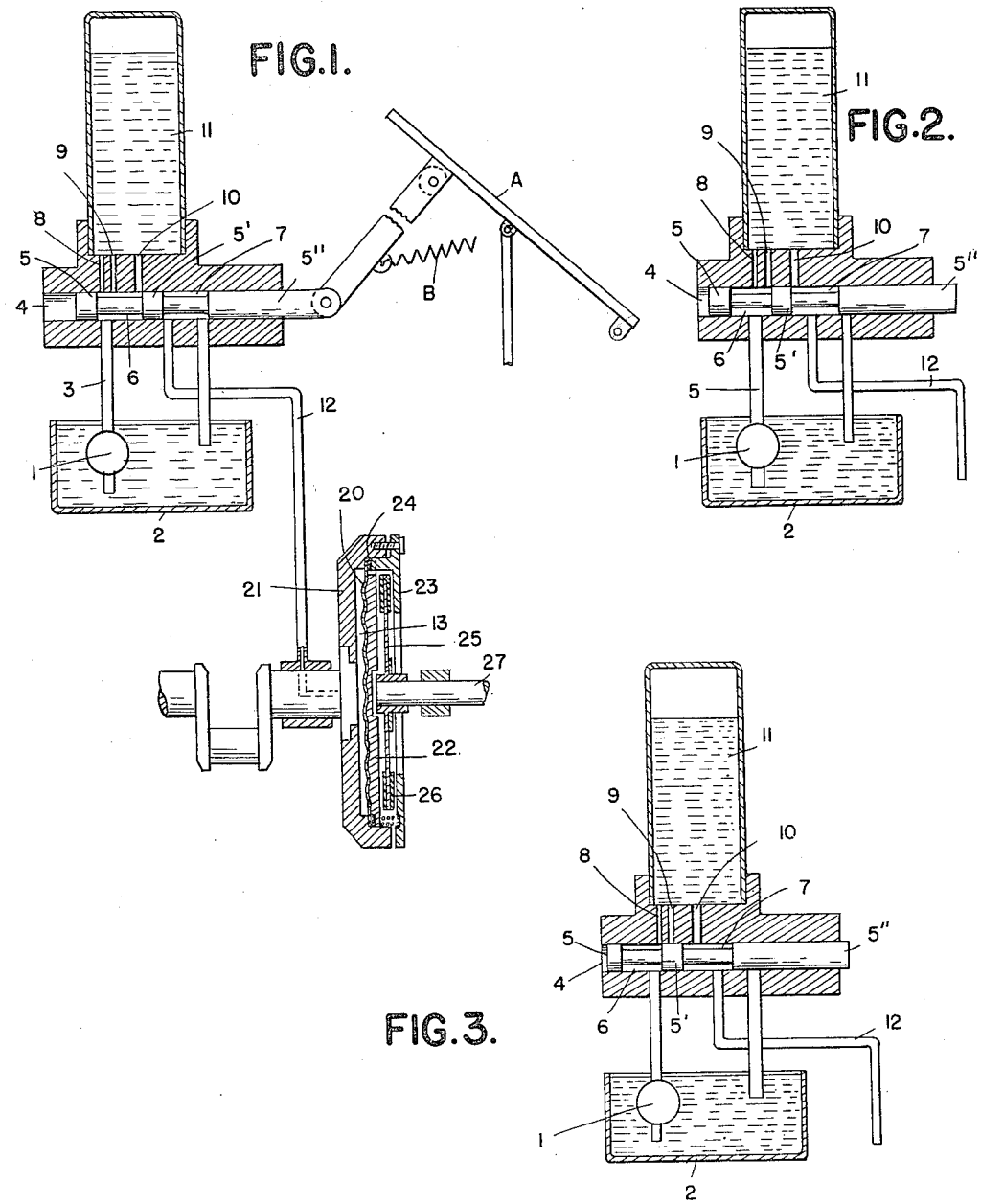

2,105,625

UNITED STATES PATENT OFFICE 2,105,625

HYDRAULICALLY ACTUATED FRICTION CLUTCH

Rudolf Wichtendahl, Hanover, Germany

Application August 21, 1936, Serial No. 97,143
In Germany August 31, 1935

7 Claims. (Cl. 192—.01)

Hydraulically actuated friction clutches intended more particularly for power driven vehicles are known and by reason of their construction respond very rapidly to the increase of pressure in the network of conduits. The purpose of the invention however is to ensure that the movements are carried out more gently, with gradual and easy engagement of the clutch. The rapid response referred to requires a particularly careful construction of the damping devices which are otherwise generally used for clutches.

For the purpose of securing gentle engagement of the clutch it is known to damp the clutch movement by providing an air vessel and providing throttling devices in the through-flow conduits.

The invention is based upon the fact that in addition to the rapid filling of the air vessel when the gas lever or throttle is in a position of rest, it is necessary also to correlate the clutching movements. This double effect is secured by opening a large passage, made up of three smaller passages, for charging the air vessel when the gas lever or throttle is in the position of rest, but the control or slide valve moves upon the depression of the gas lever or throttle with which it is connected in such manner that the first of the three passages always maintains communication between the air vessel and the clutch; while the other two remain open and thus ensure that the air vessel is sufficiently charged. Upon the further or rapid and excessive depression of the gas lever or throttle the second passage is closed, and the pressure in the air vessel is maintained through the third passage to the extent necessary for maintaining the clutch in engagement. When the gas lever or throttle is depressed too rapidly the increase of pressure in the air vessel is, by reason of the small cross-sectional area of the third passage, delayed to such an extent that the clutch engages gently under all conditions. Because of the particular cross-sectional areas of the second and third passages the control valve conforms to the change in viscosity of the oil caused by change in temperature.

The accompanying drawing diagrammatically illustrates by way of example apparatus according to the invention in longitudinal section, with the control or slide valve in three different positions respectively.

Figure 1 illustrates the apparatus out of engagement, Figure 2 shows the apparatus with the parts in engagement and the motor running idle, and Figure 3 illustrates the apparatus with the parts in engagement and the motor and pump running.

Referring to the drawing the oil pump 1 feeds the oil from the oil tank 2 through the pipe 3 into the cylinder 4 of the control or slide valve. The cylinder 4 is divided into chambers 6 and 7 by the control or slide valve formed by the connected pistons 5, 5', 5''. Three passages 8, 9, 10 which are of different diameters, lead from the valve cylinder 4 to a vessel 11 containing compressed air, wherein the oil is maintained under pressure; for the purpose of causing the clutch to engage, the oil is fed to the pressure chamber 13 in the hydraulic clutch device by way only of the passage 10, the annular chamber 7 and the pipe 12, after the control or slide valve has moved the corresponding distance.

The fluid operated friction clutch selected herein for the purpose of illustration is identical to the one featured in my copending application Serial No. 47,167, filed October 28, 1935. Briefly, the clutch comprises a flexible diaphragm 20 set into a recess formed in one face of the engine flywheel 21 and having the peripheral portions effectively clamped to the flywheel to provide the pressure chamber 13. Supported at the outer side of the diaphragm 20 is a cover plate 23 and a pressure plate 22 positioned between the diaphragm and cover plate for axial movement relative thereto. The cover plate 23 is secured to the flywheel for rotation therewith as a unit and cooperates with a compressible ring 24 to secure the periphery of the diaphragm to the flywheel. Slidably mounted between the pressure plate 22 and the cover plate 23 is a clutch disc 25 having friction linings 26 secured to opposite sides thereof adjacent the periphery of the same. With this construction, it will be seen that as pressure is built up in the chamber 13, the diaphragm 20 expands and moves the pressure plate 22 in a direction toward the clutch disc 25 to effectively clamp the peripheral portion of the disc against the cover plate. Inasmuch as the clutch disc 25 is splined on the drive shaft 27, it follows that the latter will rotate as a unit with the flywheel.

Figure 1 shows the position of the control or slide valve when the engine is being started, that is to say, when the pump is running idle or at its lowest speed. At the same time the oil is fed to the air vessel through all three passages 8, 9 and 10.

The maintenance of the cold oil under a super pressure of 5 atmospheres has the advantage of very rapid charging, so that under such conditions the action of clutching can be effected in a few seconds. This is effected by the movement of the control or slide valve into the position shown in Figure 2, the liquid content of the air vessel 11 being fed smoothly to the chamber 13 by way of the passage 10. By reason of the presence of the passages 8 and 9 the cold oil because of its viscosity at the same time flows, only in very small measure, from the pump to the air vessel during the clutching movements, but this is unimportant so far as the clutching movements are concerned.

When the oil is warm and the motor is running idle, as shown in Figure 1, a quantity of oil sufficient for carrying out the action of clutching cannot reach the air vessel because when the pump is running at a low speed it does not provide sufficient pressure. By supplying gas at the same time, that is to say, by increasing the speed of the pump, the air vessel is charged under a high pressure, while the clutching movements are in progress, thus producing engagement of the clutch.

In order to prevent (where the gas provided by the driver is too great, that is to say, where the speed of the pump is too greatly increased) the pressure in the air vessel from increasing too much and too rapidly during the clutching movements, producing too sudden an engagement of the clutch, the passage 9 of the passages leading to the air vessel is closed by the piston 5' of the supply of gas has been correctly adjusted, as shown in Figure 3. These movements take place automatically in accordance with the movements of the gas lever or throttle A, and can then be accelerated or retarded accordingly.

As indicated above, the cross sectional areas of the passages 8 and 9 are less than the cross sectional area of the passage 10 and, in the present instance, the area of the latter passage is preferably greater than the sum of the areas of the other two passages. As a consequence, initial operation of the throttle A provides for substantially reducing the volume of fluid flowing from the reservoir to the vessel 11.

In order not to obscure the drawing the safety valves which are necessary are not illustrated.

It will be understood that by the construction hereinbefore described more oil does not enter the air vessel than is withdrawn from it, the air vessel being charged through all the conduits or passages that are available, the conduit or passage controlling the emptying of the air vessel during the clutching movements serving to assist in the charging of the air vessel.

It will furthermore be understood that the control valve of the clutch is correlated in its movements with the gas lever or throttle valve. Although any one of a number of different types of connections may be provided between the valve slide and the throttle control lever A, nevertheless, for the purpose of illustration, I have diagrammatically shown the connection as comprising a link having the opposite ends pivotally connected to the valve slide and accelerator. In accordance with conventional practice, the throttle control is normally urged to its inoperative or throttle closing position by means of a spring B, and this spring serves the additional function of returning the valve slide to its normal position.

It will be observed from the foregoing that the apparatus selected for the purpose of illustration is merely diagrammatically shown and the advantageous results obtainable by this invention may be realized by a number of various different specific constructions. Accordingly, reservation is made to make such changes in the construction as may come within the purview of the accompanying claims.

I claim:

1. Means for controlling the operation of an hydraulically actuated friction clutch intended more particularly for power driven vehicles, comprising an air vessel, a reservoir for the hydraulic fluid, the hydraulically actuated friction clutch, a pump adapted to supply the hydraulic fluid to the air vessel, and a control valve for the admission of the hydraulic fluid to the air vessel and for its admission to the pressure chamber of the said clutch, the parts being connected together for operation of the clutch in the manner substantially as hereinbefore described.

2. In a fluid operated friction clutch having members movable relative to each other into clutching engagement and having a fluid pressure chamber associated with said members, means for introducing fluid under pressure into said chamber to effect relative movement of said members into engagement, said means including a vessel communicating with a source of fluid under pressure and communicating with the clutch chamber, and a valve controlling the flow of fluid from the source of supply to the vessel and for controlling the flow of fluid from said vessel to the clutch chamber.

3. In a fluid operated clutch having members movable relative to each other into clutching engagement and having a fluid pressure chamber associated with said members, the combination with a throttle control, of means for introducing fluid under pressure into said chamber to effect relative movement of said members into clutching engagement, said means including a vessel communicating with a source of fluid under pressure and communicating with the clutch chamber, and a valve controlling the flow of fluid from the source of supply to the vessel and from the vessel to the clutch chamber, said valve having a movable element responsive to operation of the throttle control and effective when the throttle control is in the substantially closed position to open communication from the source of fluid under pressure to the vessel and to close communication from the vessel to the clutch chamber and effective when the throttle is opened to open communication from the vessel to the clutch chamber and to restrict communication from the source of fluid under pressure to the vessel.

4. In a fluid operated friction clutch having members movable relative to each other into clutching engagement and having a fluid pressure chamber associated with said members, means for introducing fluid under pressure into said chamber to effect relative movement of said members into engagement, said means including a vessel communicating with a source of fluid under pressure and communicating with the clutch chamber, and means controlling the flow of fluid from the source of fluid under pressure to the vessel and from the vessel to the clutch chamber comprising a valve effective in one position to open communication from the source of fluid under pressure to the vessel and to close communication from the vessel to the clutch chamber and effective upon movement to another position to open communication from the vessel to the clutch chamber and to predeterminedly restrict communication from the source of fluid under pressure to the vessel.

5. In a fluid operated friction clutch having members movable relative to each other into clutching engagement and having a fluid pressure chamber associated with the members, means for introducing fluid under pressure into said chamber to effect relative movement of said members into clutching engagement, said means including a vessel communicating with the clutch chamber and communicating with a source of fluid under pressure through the medium of a plurality of spaced passages varying in cross sectional area, and means controlling the flow of fluid from the source of fluid under pressure to the vessel and from the vessel to the clutch chamber comprising a valve effective upon opening communication from the vessel to the clutch chamber to successively close the passages having the largest cross sectional area.

6. In a hydraulically actuated friction clutch for engine driven vehicles, the combination with a flywheel and an engine throttle control, of a member cooperating with the flywheel to form a fluid pressure chamber and movable in one direction relative to the flywheel under the influence of fluid pressure admitted to said chamber, a second member supported for rotation relative to the member aforesaid and engageable with the latter upon movement of the same in the above mentioned direction, means communicating with the pressure chamber through the medium of a plurality of passages and effective to supply fluid under pressure to said chamber, and means controlling the flow of fluid pressure through said passages to the fluid pressure chamber including a valve member operatively connected to the throttle control, said valve member being effective in the inoperative position of said throttle control to close communication between the passages and fluid pressure chamber and effective upon movement of the throttle control from its inoperative position to successively open said passages.

7. A hydraulically actuated friction clutch according to claim 6 characterized in that the cross sectional area of the first passage opened by the valve member upon movement of the throttle toward its operative position is greater than the sum of the cross sectional areas of the remaining passages.

RUDOLF WICHTENDAHL.